Reissued Jan. 22, 1935

Re. 19,436

UNITED STATES PATENT OFFICE 19,436

LUBRICATING SYSTEM AND PRODUCT

William V. Kidder, deceased, late of La Crosse, Wis., by Dean Ladd Kidder, executrix, La Crosse, Wis.

No Drawing. Original No. 1,877,668, dated September 13, 1932, Serial No. 569,354, October 16, 1931. Application for reissue August 20, 1934, Serial No. 740,717

14 Claims. (Cl. 123—196)

This invention relates to lubricating systems and products, particularly for the lubrication of the cylinder and piston bearing surfaces of internal combustion motors.

The general object of this invention is to improve the recognized benefits of lubrication by graphited oils of internal combustion motors, so as to provide a more economical system and product than heretofore and to avoid certain difficulties heretofore encountered in the use of such oils.

It is a further object of the invention to minimize the friction between the piston and the cylinder walls due to the occurrence of "broken films" of lubricating oils thereon, and occasioned also by the carbonization of the said oils under many conditions of operation, particularly of motors of automotive vehicles.

It is also an object of the invention to create and maintain a better compression in the combustion chambers of motors, by insuring a better closure thereof by the piston rings.

Also, an object of this invention is to prevent accretions of deposited carbonaceous materials on the piston head and rings, the upper cylinder walls, and the valves of motors, which deposits result from the chemical decomposition of the oil molecules due to the high temperatures of the explosion and of the exhaust gases to which these portions of the motors are exposed.

Colloidal graphite dispersions in lubricating oils have been used rather extensively to decrease the friction and wear of bearing surfaces, during the past quarter of a century or more since such material and its use was invented and introduced by Dr. Edward G. Acheson. During all of this long lubricating practice, such use of colloidal graphite has comprehended its introduction into the bearings of internal combustion motors exclusively and solely through the medium of the lubricant in the crank case, and never by the admixture of the colloidal material with the fuel.

It has been found, however, that the various above-recited objects of the invention are attained by adding the colloidal graphite to the fuel itself, such as the gasoline in the storage or supply tank of the motor, and by thereby introducing this microscopically fine and very efficient heat-resisting solid lubricant into the combustion chamber directly, rather than through the intermediary of the crank case oil. It has been shown that by this novel means an efficient, high temperature resisting lubrication of the hot cylinder and piston walls is more economically accomplished than heretofore.

The piston head and rings and the cylinder walls are exposed to exploding gases of very high temperatures; and the surfaces of these metal members of the motor consequently acquire temperatures high enough to occasion a decided lowering of the viscosity of the oil, and, furthermore, the chemical decomposition of the oil molecules to a minor degree. The result of these combined effects is that the film of oil on the bearing surfaces of the piston and cylinder becomes so thin, or light bodied, that the film is occasionally ruptured, particularly by the shocks of a moving vehicle, and a so-called "broken film" occurs which allows occasional contact of metal to metal with consequent increase in friction and heat.

It appeared that these, and other conditions which it is hardly necessary to recite, make the problem of lubricating the cylinders and pistons of explosion motors one which is distinct from the lubrication of the crank shaft and connecting rod bearings, etc. in the lower part of the engine by the oil in the crank case. All of these latter bearing surfaces operate at much lower temperatures than the surface temperatures of the piston and cylinder and rarely much exceed the temperature of boiling water.

An oil of a body or viscosity suitable for the shaft and connecting rod bearings under all variations of temperature and other conditions obtaining in the crank case, is therefore too thin for the optimum lubrication of the much hotter cylinder and piston surfaces. Heretofore the best compromise attainable has been made between the divergent requirements of these contrasted lubrications. That the compromise effected has not been an ideal solution of the problem is evidenced by the fact that 50% of the friction in internal combustion motors is that between the piston and cylinders alone.

Dr. Acheson sought to overcome these difficulties about twenty-five years ago by adding colloidal graphite as a stand-by lubricant to crank case oil, with the thought that the graphoid surface, eventually formed thereby on the metal bearing surfaces, would prevent metal-to-metal contact and the consequent high friction whenever the film of oil itself was momentarily broken. The considerable measure of success which resulted from Acheson's system was, however, attained at considerable cost and inconvenience to the automobile owner or driver.

In eight quarts of crank case oil, for example, weighing, roughly, on the average, fifteen pounds or about two hundred and fifty ounces, it was found necessary to add about 0.3% or .75 ounce of colloidal graphite calculated as a solid, by the Acheson system. That quantity would rarely, if ever, suffice for lubrication of more than 1000 car miles, since normal use of crank case oil is 500 miles. As colloidal graphite dispersions are rather expensive, particularly when retailed in small quantities to the automobilist, this element of cost has hindered the widespread adoption of the Acheson system for automobile motor lubrication.

Moreover, in many instances, acids are developed in the crank case oil through oxidation which, it is claimed, flocculate or precipitate the colloidal graphite when it is present in crank case oil in concentrations as high as have been employed in the Acheson system. This also impairs the efficiency of the graphite as a lubricant, and, in some instances, causes stoppage of fine oil ducts or passages by the considerable percentage of precipitated graphite.

In U. S. Letters Patent No. 1,879,874, there has been disclosed how avoidance of such precipitation and stoppages may be attained at a much diminished cost, without dispensing with the many advantages attending the use of colloidal graphite as a constituent of crank case oil. As said patent discloses, this is accomplished by reducing the concentration of the graphite in crank case oil to between one-half to one-twentieth of that heretofore used. But such diminished concentrations, although they are effective as a stand-by lubricant for crank shaft and connecting rod bearings, are too low for the more stringent requirements of piston and cylinder lubrication at higher temperatures as hereinabove explained.

By the present invention there has been devised a novel colloidal graphite lubricating system and product, whereby the lubrication of the cylinder and piston walls is effected from a different source of lubricant supply and with dispersions of different orders of concentration than has been found to be desirable for the best results in the crank case oil. To this end there has been prepared a colloidal graphite dispersion or suspension in any petroleum or similar organic compound, but preferably in neutral, filtered lubricating oil, and which can be of any suitable concentration, but preferably about 0.2%. This is added to the gasolene fuel in the tank of the car, for example, in the proportion of four ounces of the dispersion to each five gallons of gasolene during the first five hundred to one-thousand miles traveled during its use. This quantity is sufficient to establish the desirable graphoid film under these conditions.

Thereafter, at all times, and to maintain that film against wear, there is added, for example, one ounce of the 0.2% dispersion to each five gallons of gasolene used. In an automobile of average efficiency, which will travel, say, fifteen miles with each gallon, 66.6 gallons of gasolene will be consumed for each one thousand miles; and 66.6 divided by 5, or 13.5 ounces of 0.2% colloidal graphite dispersion in oil, which will contain .027 ounce of the solid graphite, will therefore be required for maintaining a graphoid film in the cylinders and on the pistons by this system. The original conditioning of the motor to build up such a film will require four times as much, or about .10 ounce of solid graphite, as will be evident from the foregoing, after which only .027 ounce of the graphite will be requisite for each 1000 car miles.

Five gallons of gasolene will weigh approximately twenty-nine pounds or 464 ounces, and in this may be suspended, as above explained, one ounce of 0.2% dispersion, or .002 ounce of the solid colloidal graphite. The concentration of the solid graphite suspension in the fuel therefore needs to be only about .0004 per cent. Many tests show that this low concentration is sufficient and attest the remarkable efficiency of this novel lubricating system.

By this improved system, therefore, efficient cylinder lubrication will be maintained by the use of approximately one twenty-fifth of the quantity of colloidal graphite, viz: .75 ounce, required by the Acheson system as before explained, with a corresponding reduction in expense. Nevertheless, the suspension of colloidal graphite which is deposited on the hot cylinders and piston walls is substantially the same concentration as was specified by Acheson and those many other authorities who helped introduce his system to automobilists; for all of these authorities prescribed from .10 to .30%, or an average of .20% dispersion of graphite, and therefore the same concentration may be used for lubrication by the novel means of this system.

Colloidal graphite particles dispersed in oils or other liquids are, as is well known, of microscopic or submicroscopic dimensions; consequently they are readily carried into the combustion chamber of the motor by the stream of air and combustible vapors from the carburetor. Upon entering the chamber, much or most of the molecularly fine graphite particles deposit, during the compression stroke, on the oily metal surfaces. Those particles which remain in the explosive mixture in the chamber are projected against and adhere to the oily surfaces by the turbulence of the explosion.

When used in motors provided with reasonably clean cylinders, piston heads and rings and valves, a graphoid film thereon is gradually built up by this system during the first one thousand miles or less of use, as was hereinbefore explained. After the graphoid film has begun to build up, hard, carbonaceous accretions from the burning of lubricating oil will no longer deposit on the film, to which, for some unknown reason, they do not adhere as they do to bare metal.

It is well known and established that colloidal graphite fills up the pores and surface inequalities of bearings, and thus insures a more complete closure between cylinder walls and piston rings, and, thereby, creates a better compression. This is further promoted by the fact that the piston rings, after they are covered by the graphoid film, move more freely at all times and do not stick to the piston through the deposition of hard carbonaceous materials.

By the term "suspension", as used in the description and claims of this application, there is implied both true dispersions of colloidal graphite and also physical or chemical states of aggregation such as those which result from the addition of colloidal graphite dispersions in oil to other fluids, such as gasolene or its vapors, and which may alter the physical state of the graphite. It is not definitely known what happens when colloidal graphite dispersions are so suspended, except that the graphite is rendered somewhat less filterable. The terms "suspension" and "suspending", etc., have been used herein to cover such states of aggregation in liquids, vapors, and gases, as well as true dispersions. These terms, however, are used to distinguish from ordinary, finely powdered graphite such as was suggested as an addition to lubricating oils by Lucas in United States Patent 721,057, and which kinds of graphite may be floated in oils or other petroleum products only by mechanical stirring of such liquids.

Although this invention has been described as applied particularly to the lubrication of the cylinders and pistons on automobile motors, it will be understood that the system or product is not restricted thereto, but can be used with other internal combustion motors without departing from the spirit and scope of the invention. Many other forms in which this invention may be embodied will occur to those skilled in the art, and the fact that there have been specifically illustrated and described only a few of such forms is not intended as a limitation.

I claim as his invention:

1. A method of lubricating internal combustion motors, which comprises preparing a dispersion of colloidal graphite in oil, adding the dispersion to the motor fuel, and introducing the mixture through the carburetor into the combustion chamber during the operation of the motor.

2. A method of lubricating internal combustion motors, which comprises preparing a suspension of colloidal graphite in the motor fuel in such quantity as to give a concentration of approximately .0004% of graphite therein, and then introducing the mixture through the carburetor into the combustion chamber during the operation of the motor.

3. A method of lubricating internal combustion motors, which comprises preparing a dispersion of colloidal graphite in oil, adding the dispersion to the motor fuel in such quantity as to provide a concentration of approximately .0004% of the graphite therein, and introducing the mixture through the carburetor into the combustion chamber during the operation of the motor.

4. A combined fuel and lubricant for internal combustion motors, comprising gasolene and lubricating oil, and a suspension of colloidal graphite therein.

5. A combined fuel and lubricant for internal combustion motors, comprising gasolene and a suspension of approximately .0004% of colloidal graphite therein.

6. A method of lubricating internal combustion motors, which comprises preparing a suspension of colloidal graphite in the motor fuel in such quantity as to give a concentration of not more than approximately .0016 per cent of graphite therein, and then introducing the mixture through the carburetor into the combustion chamber during the operation of the motor.

7. A method of lubricating internal combustion motors, which comprises preparing a suspension of colloidal graphite in the motor fuel in such quantity as to give a concentration of from approximately .0004 per cent to approximately .0016 per cent of graphite therein, and then introducing the mixture through the carburetor into the combustion chamber during the operation of the motor.

8. A method of lubricating internal combustion motors which comprises preparing a suspension of colloidal graphite in a mixture of gasoline and lubricating oil in such quantity as to give a concentration of not more than approximately .0016 per cent of graphite therein, and then introducing the mixture through the carburetor into the combustion chamber during the operation of the motor.

9. A method of lubricating internal combustion motors having carburetors, which comprises preparing a suspension of colloidal graphite in a mixture of gasoline and lubricating oil in such quantity as to give a concentration sufficiently low to prevent clogging of the carburetor while being sufficient to form a graphoid film in said motor, and then introducing the mixture through the carburetor into the combustion chamber during the operation of the motor.

10. A combined fuel and lubricant for internal combustion motors comprising gasoline and a suspension of not more than approximately .0016 per cent of colloidal graphite therein.

11. A combined fuel and lubricant for internal combustion motors comprising gasoline and a suspension of approximately .0004 per cent to approximately .0016 per cent of colloidal graphite therein.

12. A combined fuel and lubricant for internal combustion motors comprising gasoline and lubricating oil and a suspension of not more than approximately .0016 per cent of colloidal graphite therein.

13. A combined fuel and lubricant for internal combustion motors comprising gasoline and a suspension of not more than approximately .0016 per cent of graphite which will remain substantially uniformly distributed throughout said gasoline without mechanical stirring.

14. A method of lubricating internal combustion motors having carburetors, which comprises preparing a suspension of colloidal graphite in a mixture of gasoline and a petroleum organic compound in such quantity as to give a concentration sufficiently low to prevent clogging of the carburetor while being sufficient to form a graphoid film in said motor, and then introducing the mixture through the carburetor into the combustion chamber during the operation of the motor.

DEAN LADD KIDDER,
*Executrix of the Estate of William V. Kidder, Deceased.*